US 6,716,906 B1

(12) United States Patent
Houman et al.

(10) Patent No.: US 6,716,906 B1
(45) Date of Patent: *Apr. 6, 2004

(54) ABUSE RESISTANT SKIM COATING COMPOSITION

(75) Inventors: Thomas G. Houman, Chicago, IL (US); Richard B. Stevens, Crystal Lake, IL (US); Therese A. Fults, Woodale, IL (US); Timothy G. Kenny, Libertyville, IL (US)

(73) Assignee: United States Gypsum Co, Chicago, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 78 days.

(21) Appl. No.: 09/716,392

(22) Filed: Nov. 20, 2000

(51) Int. Cl.⁷ .............................. C08K 3/34; C08L 3/26; C08L 31/04
(52) U.S. Cl. ........................ 524/492; 524/425; 524/563
(58) Field of Search ................. 524/492, 563, 524/425, 423; 106/715, 772, 781, 461, 764, 482, 464

(56) References Cited

U.S. PATENT DOCUMENTS

| | | | |
|---|---|---|---|
| 3,895,018 A | * 7/1975 | Adolf | ............................ 524/4 |
| 4,366,209 A | 12/1982 | Babcock | |
| 4,367,300 A | * 1/1983 | Aoki et al. | ..................... 524/2 |
| 4,514,471 A | 4/1985 | Sugimoto et al. | |
| 4,729,919 A | 3/1988 | Uroda | |
| 4,743,475 A | 5/1988 | Negri et al. | |
| 4,820,754 A | 4/1989 | Negri et al. | |
| 5,024,554 A | * 6/1991 | Benneyworth et al. | ....... 404/74 |
| 5,447,798 A | 9/1995 | Kamaishi et al. | |
| 5,494,741 A | 2/1996 | Fekete et al. | |
| 5,712,337 A | 1/1998 | Descho | |
| 5,869,166 A | * 2/1999 | Caldwell | .................... 428/142 |
| 5,873,936 A | 2/1999 | Ogden | |
| 5,891,948 A | * 4/1999 | Kano | ......................... 524/492 |
| 6,063,472 A | 5/2000 | Takaoka et al. | |
| 6,180,037 B1 | * 1/2001 | Andersen et al. | ........... 264/108 |

* cited by examiner

Primary Examiner—Callie Shosho
(74) Attorney, Agent, or Firm—Donald E. Egan; John M. Lorenzen; David F. Janci

(57) ABSTRACT

Disclosed is a ready-to-use self-gauging coating compound containing about 65%–75% solids that provides a flat finely textured finish with improved abuse (abrasion) resistance properties. The coating composition comprises a resin binder in which there is dispersed an aggregate consisting of particles in a selected size range in a quantity sufficient to form a layer of particles one particle deep on the substrate when the coating is applied to the substrate.

13 Claims, 2 Drawing Sheets

ABUSE RESISTANT SKIM COATING COMPOSITION

FIELD OF INVENTION

The present invention relates to a ready-to-use self-gauging coating compound containing about 65%–75% solids that provides a flat finely textured finish with improved abuse (abrasion) resistance properties. More specifically, the coating composition of the present invention comprises a resin binder in which there is dispersed an aggregate consisting of particles in a selected size range in a quantity sufficient to form a layer of particles on the substrate that is equal to, but not exceeding the size of the largest particles. This coating offers an enhanced wall finish that can easily be decorated with paint.

BACKGROUND

The current state of the Drywall Finishing Industry requires intensive labor to achieve a smooth final wall appearance. Even when a smooth wall has been produced using traditional finishing compounds, the walls are subject to damage from nicks, dings, scratches scrapes and dents.

The present invention provides a composition to easily achieve a flat, defect free wall surface and provide the additional advantage of dramatically improved abuse resistance. The coating composition of the present invention provides the user with a self-gauging, smoothing coating compound that can be applied to the wall with a trowel or roller and floated smooth. Alternatively, this coating may spray applied.

SUMMARY OF INVENTION

The present invention relates to a ready-to-use, self-gauging coating compound that provides a flat finely textured finish with improved abuse (abrasion) resistance properties. The coating composition of the present invention comprises a resin binder in which there is dispersed an aggregate consisting of particles in a selected size range in a quantity sufficient to form a layer of particles on the substrate that is one particle deep. Preferably, the relatively large aggregate particles in the layer are closely spaced, with the finer particles of filler taking up the interstitial space. The abuse resistance tests, as determined by ASTM D4977 (modified), show the compositions of the present invention survive from 200 to 1000 cycles, and can be extended to as many as 5000 cycles, as compared to unpainted gypsum drywall that typically fails after 20 to 30 cycles.

The coating of the present invention may be applied over newly installed commercial wallboard such as SHEETROCK® Brand Gypsum Panels, abuse resistant wallboard such as SHEETROCK® Brand Gypsum Panels, Abuse-Resistant, and gypsum/fiber board such as FIBEROCK® Brand Panels, to meet the Gypsum Association Level 5 Finish and provide improved abuse resistance. The coating can also be applied over old substrates (drywall, plaster or concrete) in a one-coat application in order to provide a surface of improved appearance with improved abuse (abrasion) resistance properties. The thickness of the installed coating and the resulting abuse-resistance varies somewhat depending upon the nature of the substrate coated.

The abuse resistant coating composition of the present invention preferably falls within the composition limits, on a dry weight percent basis, as shown in Table 1.

TABLE 1

| Component | Weight Percent |
| --- | --- |
| Aggregate - 30–50 mesh | 18 to 55 |
| Resin | 3 to 10 |
| Filler | 30 to 71 |
| Mica | 0 to 4 |
| Talc | 0.0 to 10 |
| Attapulgus clay | 0.0 to 3.0 |
| Cellulose thickener | 0.2 to 0.6 |
| Preservative | 0.05 to 0.2 |

The self-gauging smoothing compound of the present invention is a high-solids, high latex formulation, which contains specific sized aggregate that acts as a gauge or screed. It has been found that a self-gauging coating compound can be formed by adding an aggregate having a specially selected size particles to compositions that are similar to joint compound formulations. The self-gauging nature of the present invention provides for a uniform thickness of coating over the wall surface, improving the uniformity of appearance for the wall, and also the ability of the coating to provide abuse resistance. Application of too little or too much coating would degrade appearance and abuse resistance. Thus the screeding nature of these compositions result in a more limited skill level required to achieve an even finished appearance as well as proper function. This is especially important when using the chemically setting base to ensure that the base has sufficient thickness and water retention to chemically set. The controlled depth feature also facilitates smoothing the surface with a float, resulting in an attractive, uniform appearance, while ensuring proper coating thickness and aggregate density for dramatically enhanced abrasion resistance. In the preferred embodiment, the coating composition of the present invention comprises a resin binder in which there is dispersed aggregate particles passing a 30-mesh screen and retained on a 50-mesh screen. The preferred aggregate for the abuse resistant coating composition of the present invention is silica sand.

The coating composition may be applied either by roller, or by trowel or it may be spray applied. The coating compositions may be either a drying type (with a calcium carbonate filler) or a setting type (with a calcium sulfate hemi-hydrate base).

DESCRIPTION OF DRAWINGS

In order that the invention may be more readily understood, including the preferred embodiments of the invention, reference is made to the drawings, in which.

DETAILED DESCRIPTION OF THE PRESENT INVENTION

Figure 1:
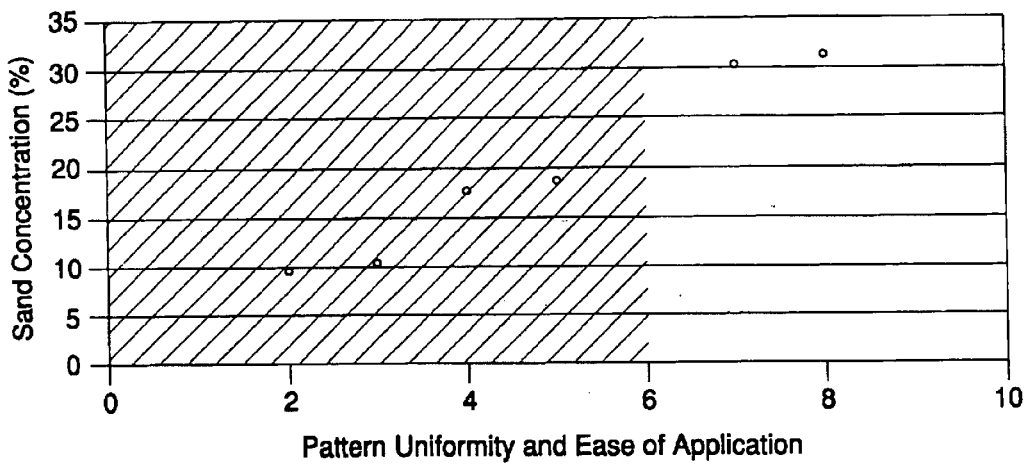
FIG. 1 is a graph of the relationship between the concentration of sand aggregate in a coating composition and the ease of application of the coating.

The coating composition of the present invention comprises a resin binder in which there is dispersed an aggregate consisting of particles in a selected size range in a quantity sufficient to form a layer or matrix film of particles on the substrate that is one particle deep. The self-gauging coating composition of the present invention is a high solids, high latex formulation which contains specific sized aggregate that acts as a gauge or screed. It has been found that a self-gauging coating compound can be formed by adding a special type of aggregate having a specially controlled size to compositions that are similar to joint compound formulations.

The coating composition of the present invention comprises a resin binder in which there is dispersed a quantity of aggregate of particles passing a 30 mesh (11 mesh/cm) screen and retained on a 50 mesh (20 mesh/cm) screen to sufficient form a matrix or film of particles that is one particle deep. The coating compositions of the present invention produce coatings have an average thickness of from about 0.020 inches (508 microns) to about 0.050 inches (1270 microns) and have from 200 to about 1000 particles per square inch (31 to 155 particles per square centimeter). The thickness of the installed coating and the resulting abuse-resistance varies somewhat depending upon the substrate coated. Standard abuse resistance tests using a wire brush scrub to measure surface damage (ASTM D4977 modified) produce results from 200 to 1000 cycles, and can be extended to as many as 5000 cycles as compared to unpainted gypsum drywall that typically lasts for 20 to 30 cycles.

Aggregate

The aggregate that is a component of the coating composition is preferably a silica sand. The sand or other equivalent aggregate may be, generally characterized as a fine grade of aggregate, i.e. in which substantially all of the particles pass through a No. 30 (11 mesh/cm) U.S. Standard sieve screen and in which substantially all of the particles are retained on a No. 50 (20 mesh/cm) US Standard sieve screen. Other types of fine aggregate that are functionally equivalent to the fine silica sand, such as limestone, may also be used in the coating composition, either in place of fine silica sand or in combination with fine silica sand. Particle size control is important for uniform troweling and float finishing. Aggregates that do not have a particle size within these tight tolerances give poor troweling and float finishing properties, resulting in unsightly surface defects such as streaks and gouges. Use of aggregate within this particle size range insures an even uniform appearance and depth of coating.

The preferred aggregate for the abuse resistant coating composition is Wedron Washed Silica Sand Frac San 30-50. The 30-50 is a standard designation essentially specifying 90% minus 30 mesh (11 mesh/cm) and 90% plus 50 mesh (20 mesh/cm). Alternatively, the aggregate may be a limestone having a similar range of particle sizes, 99% minus 30 mesh (11 mesh/cm) and 80% plus 50 mesh (20 mesh/cm).

The fine sand or other functionally equivalent aggregate should be present in the coating composition of this invention in a quantity sufficient to form an applied layer or matrix of aggregate particles one particle thick. Within that layer, the aggregate should be closely spaced. It has been found that coatings that have a particle count of 200 to 1000 particles per square inch (31 to 155 particles per square centimeter) and preferably 450 to 650 particles per square inch (70 to 101 particles per square centimeter), using 30-50 sand aggregate, provide improved abuse resistance.

Generally the desired particle count for the float finish compositions require from about 7.5 to about 75 wt % of aggregate, preferably about 18 to about 49 wt % of aggregate, and most preferably, about 25 to about 35 wt % of aggregate, based on the weight of the dry coating composition. Spray finish compositions require a different range, from about 10–75 wt % of aggregate, preferably about 30–55 wt % of aggregate, and most preferably 35–50 wt % of aggregate, based on the dry weight of the composition.

Resin

The coating compositions of the present invention must include a resin that functions as a binder. Two principal classes of latex resin binders that have been used are polyvinyl acetate homopolymers and ethylenevinyl acetate copolymers. Vinyl acrylics binders also may be used.

The coating compositions of the present invention may use the following specific polyvinyl acetate homopolymers (but would not be limited to only these examples).

| Product | Supplier | % solids |
| --- | --- | --- |
| Halltech 41-355 | Halltech, Inc. | 58% |
| Wallpol CPS 104 | Reichhold | 60% |
| Dur-o-set CP 1050 | National Starch and Chemical Corp. | 58% |
| Fullatex PD-722 | H.B. Fuller | 60% |
| Halltech HP 19-39M | Halltech, Inc. | 59% |
| Project R575E | SPI | 60% |

The coating compositions of the present invention may use the following ethylene vinyl acetate copolymers (but would not be limited to only these specific examples).

| Product | Supplier | % solids |
| --- | --- | --- |
| Airbond 526BP | Air Products and Chemicals | 55% |
| Dur-o-set CP1214 | National Starch and Chemical Corp. | 55% |
| CPS 743 | Reichhold | 60% |

Filler and Other Materials

The coating compositions of the present invention preferably include sufficient filler to fill the interstitial spaces between the aggregate particles. The filler also provides cover for the coating compositions and in the case of setting compositions; the calcium sulfate filler provides the setting binder. Other materials that are preferably used are mica, talc clay and cellulose thickeners.

Application

The coating compositions of the present invention may be applied by either roller or trowel and smoothed with a float or they may be spray applied to wall surfaces. When smoothing with a trowel or float, the aggregate acts as a screed controlling the thickness and evenness of the finish so that a limited skill level is needed to achieve an even appearance. Standard scrub tests with a wire brush measuring surface damage (ASTM D4977 modified) have produced results from 200 cycles (drying types) to 1000 cycles, and the technology is capable of producing resistance to 5000 cycles.

Compositions

The abuse resistant coating compositions that are setting type, designed for float finishing, fall within the parameters shown in Table 2. The compositions are shown as weight percentage on a dry basis.

TABLE 2

| Component | Useable Range | Preferred Range | Most preferred |
|---|---|---|---|
| Silica Sand 30–50 mesh aggregate | 7.5–55 | 18–48 | 30.18 |
| Resin | 2.5–12 | 3–9 | 7.78 |
| Calcium sulfate hemihydrate filler | 40–85 | 44–71 | 57 |
| Mica | 0–10 | 1.3–2.1 | 1.68 |
| Attapulgus clay | 1–5 | 1.9–3.1 | 2.51 |
| Set preventer | 0.1–0.6 | 0.21–0.33 | 0.27 |
| pH Adjuster | 0–2 | 0.05–0.08 | 0.07 |
| Cellulose thickener | 0.15–1.0 | 0.26–0.41 | 0.34 |
| Preservative | 0.15–0.2 | 0.15–0.2 | 0.17 |

Compositions of this type chemically set and harden into calcium sulfate dihydrate by addition of a set initiator, added at the rate of 4.9 grams of set initiator per 100 grams of coating. The best combinations of abuse resistance and application properties are achieved by using a relatively large proportion of aggregate and a relatively large proportion of resin.

The abuse resistant coating compositions that are drying type, designed for float finishing, fall within the parameters shown in Table 3. The compositions are shown as weight percentage on a dry basis.

TABLE 3

| Component | Useable Range | Preferred Range | Most preferred |
|---|---|---|---|
| Silica Sand 30–50 mesh aggregate | 7.5–75 | 18.5–49 | 31.26 |
| Resin | 2.5–12 | 3–9 | 7.25 |
| Calcium carbonate filler | 20–85 | 37–60 | 48.45 |
| Mica | 0–10 | 2.4–3.9 | 3.13 |
| Talc | 0–10 | 6–9.7 | 7.81 |
| Attapulgus clay | 1–5 | 1.2–1.95 | 1.56 |
| Cellulose thickener | 0.15–1.0 | 0.36–0.58 | 0.47 |
| Preservative | 0.15–0.1 | 0.05–0.08 | 0.06 |

The abuse resistant coating compositions that are drying type, designed to be applied by spraying, fall within the parameters shown in Table 4. The compositions are shown as weight percentage on a dry basis.

TABLE 4

| Component | Useable Range | Preferred Range | Most preferred |
|---|---|---|---|
| Calcium carbonate 30–50 mesh aggregate | 10–75 | 30–55 | 43.59 |
| Resin | 2.5–15 | 5–10 | 6.15 |
| Calcium carbonate filler | 10–75 | 30–55 | 49.54 |
| pH Adjuster | 0–0.4 | 0.15–0.30 | 1.2 |
| Cellulose thickener | 0.15–1.0 | 0.2–0.6 | 0.41 |
| Preservative | 0.05–0.15 | 0.05–0.15 | 0.01 |

EXAMPLES

The following examples will serve to illustrate the preparation of several abuse resistant coating compositions within the scope of the present invention. It is understood that these examples are set forth for illustrative purposes and that many other compositions are within the scope of the present invention. Those skilled in the art will recognize that similar coating compositions may be prepared using other quantities of materials and equivalent species of materials than those illustrated below.

Example 1

An abuse resistant coating composition of the setting type for float application was prepared in accordance with the formulation shown in Table 5.

TABLE 5

| Component | Pounds (Wet) | Pounds (Dry) | Percent (Dry) |
|---|---|---|---|
| Silica Sand 30–50 mesh Aggregate | 450 (205 kg) | 450 (205 kg) | 18.62 |
| Resin | 200 (91 kg) | 116 (53 kg) | 4.8 |
| Calcium sulfate hemihydrate filler | 1700 (773 kg) | 1700 (773 kg) | 70.36 |
| Mica | 50 (23 kg) | 50 (23 kg) | 2.07 |
| Attapulgus clay | 75 (34 kg) | 75 (34 kg) | 3.10 |
| Set Preventer | 8 (3.6 kg) | 8 (3.6 kg) | 0.33 |
| pH Adjuster | 2 (0.91 kg) | 2 (0.91 kg) | 0.08 |
| Cellulose thickener | 10 (4.5 kg) | 10 (4.5 kg) | 0.41 |
| Preservative | 5.2 (2.4 kg) | 5.2 (2.4 kg) | 0.21 |
| Water | 742 (337 kg) | | |
| Total Weight | 3242.2 (1474 kg) | 2416.2 (1098 kg) | 99.98 |

The Silica Sand 30-50 mesh aggregate was Wedron Silica Sand 30-50, sold by Fairmount Minerals that contains 90% of the particles between the designated screen sizes.

The resin was Halltech 41-355, a 58% solids polyvinyl acetate Sold by Halltech.

The calcium sulfate hemihydrate filler was HYDROCAL A Base old by United States Gypsum Co.

The mica was P80F Mica that is sold by United States Gypsum Co.

The attapulgus clay was Super Gel B sold by Milwhite.

The set preventer was tetrasodium pyrophosphate (TSPP) sold by FMC.

The pH adjuster was citric acid.

The cellulose thickener was Methocel 240, methylhydroxypropyl cellulose sold by Dow Chemical.

The preservative was a mixture of 2 parts by weight of Troysan 174, 2 parts by weight of Fungitrol 158 and 1.2 parts by weight of Skane M-8.

The composition was prepared by blending the water, preservatives with a premixed solution of set preventer, pH adjuster and water. Dry ingredients were added to liquid fraction and blended for 5 minutes using a Hobart mixer. Sufficient water was added to achieve a viscosity of 400–500 Brabender Units (B.U.; as measured with a Pin Type Sensor using a Brabender Viscocorder equipped with a 250 cmg head). The product was packaged and set aside until time of use.

Compositions of this type may be caused to chemically set and harden into a calcium sulfate dihydrate base by addition of a set initiator at the time of use, added at a rate of 146 gm (set initiator)/2982.2 gm (coating of table 5). The set initiator has a composition of 47.29% water, 23.63% gypsum, 23.63% zinc sulfate, and 5.45% attapulgus clay.

At the time of use, the material was made to set by addition of an activator yielding a set time of 80 minutes. The material was also thinned to a viscosity of 300 B.U., and then applied onto FIBEROCK® panels, smoothed using a plastic float and allowed to dry for 1 week. When dry, the coating had an average thickness of 0.037 inches (940 microns). Film thickness is determined by holding a metal bar tightly against the coated substrate, measuring the distance from the substrate to the metal bar. Thus film thickness is a measurement from the substrate to a plane created by the bps of the largest particles in the film. There were about 450 to 650 aggregate particles per square inch (70 to 101 particles per square centimeter).

Abuse resistance was determined by ASTM D4977 (modified). Samples were cut from finished panels and were placed into a mechanical device used to scrub a wire brush (of a type available for this purpose from 3M) under a load of 27.5 pounds (12.5 kg) back and forth over the surface of the test panels until the surface of the test panel showed damage that could not be concealed by paint. This level of abuse (abrasion) damage is given as the number of cycles (a cycle is one back and forth motion). Compositions of the type shown in Example 1 when applied to a FIBEROCK ® substrate generated cycles of abrasion resistance in the range of 540 to 900 cycles, as compared to unpainted gypsum drywall giving 20 to 30 cycles of abuse resistance.

A series of setting-type coating compositions were prepared in the manner of Example 1 wherein the relative amount of aggregate and resin was varied as shown in Table 6. The coatings were applied to gypsum wallboard substrates in the manner of Example 1 and for each sample, the particles per square inch were determined and the film thickness was measured. The results are shown in Table 6.

TABLE 6

| No. | Aggregate % | Resin % | Particles/ square inch | Thickness (mils) | Abuse Resist. |
|---|---|---|---|---|---|
| 1 | 10.32 | 5.32 | 200 (31 per cm²) | 26 (660 microns) | 5 |
| 2 | 18.7 | 4.82 | 473 (73 per cm²) | 34 (864 microns) | 3 |
| 3 | 31.51 | 4.06 | 488 (76 per cm²) | 25 (635 microns | 5 |
| 4 | 9.71 | 10.1 | 224 (35 per cm²) | 21.3 (541 microns) | 9 |
| 5 | 17.84 | 9.2 | 504 (78 per cm²) | 33 (838 microns) | 9 |
| 6 | 30.28 | 7.8 | 608 (94 per cm²) | 32 (813 microns) | 9 |

*Abuse Resistance defined as level of damage on 1–10 scale (10 = highly resistant) from data from ASTM D4977 (modified as described) at 540 cycles.

The data in Table 6 showed that the film thickness of the coating compositions that were applied and then smoothed using a float stayed within a fairly narrow range (i.e. from about 20 to about 35 mils (508 to 890 microns), even when the relative amount of aggregate (as reflected by the particle count) was varied over fairly wide limits.

A balance of properties is necessary to generate a preferred abuse resistant coating. FIG. 1 is a graph of the relationship between the concentration of sand aggregate in coating compositions (percent by weight) and the ease of application/appearance (pattern uniformity) of the coating composition. "Application Ease/Appearance" shown in the graph is a subjective evaluation defined as the length of time required to produce an acceptable uniform finish. A rating of 1 requires extensive and prolonged troweling and smoothing with a float to produce a uniform finish. A rating of 10 requires minimum effort and time using a float to achieve a uniform finish. The target values are a rating of 6 or higher on the X-axis. FIG. 1 shows that higher concentrations of aggregate result in improved ease of application and more uniform appearance.

Figure 2:
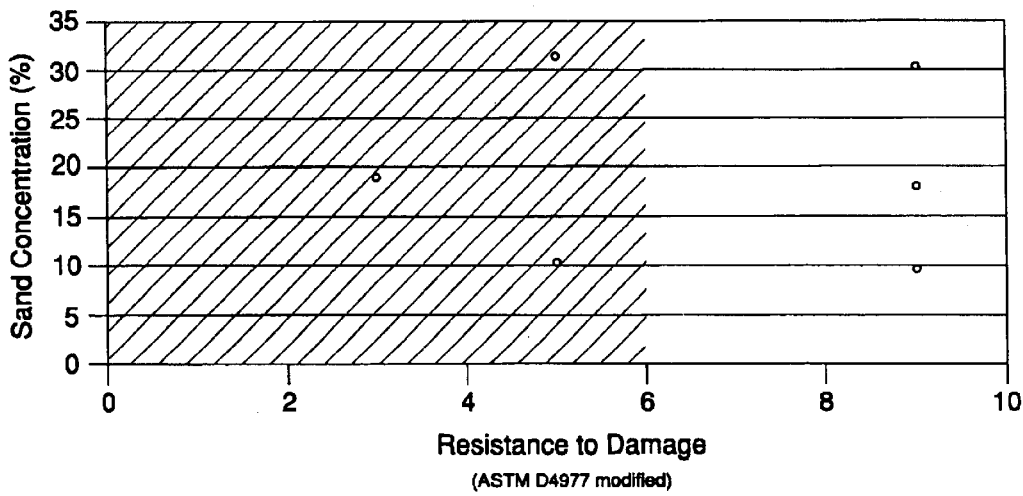
FIG. 2 is a graph of the relationship between the concentration of sand aggregate in a coating composition and the abuse resistance of the coating.

FIG. 2 is a graph of the relationship between the concentration of sand aggregate in coating compositions (percent by weight) and the abuse resistance of the coating composition. "Abuse Resistance" is a subjective evaluation defined as the resistance to damage when a coating subjected to 540 cycles in a modified ASTM D4977 test in which the sample is scrubbed back and forth by a wire brush (from 3M) under a load of 27.5 pounds (12.5 kg). A rating of 1 means continuous, immediate damage. A rating of 10 means the surface showed little or no visible damage. The target values are a rating of 6 or higher on the X-axis. FIG. 2 shows that target values for abuse resistance may be achieved over a wide range of sand aggregate concentrations. Thus for both abuse resistance and application ease/appearance, a higher sand aggregate concentration produces the best results.

Figure 3:
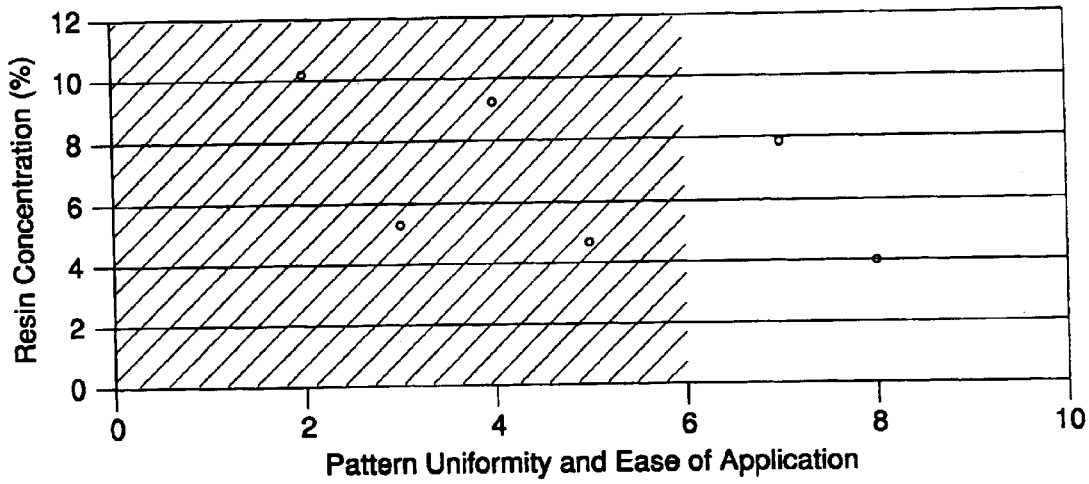
FIG. 3 is a graph of the relationship between resin concentration in a coating composition and the ease of application of the coating.
Figure 4:
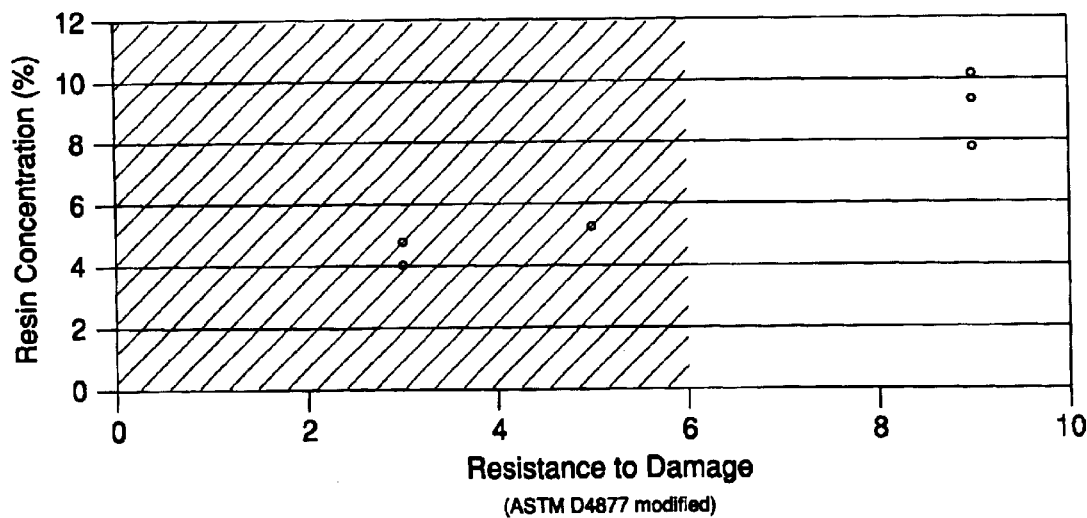
FIG. 4 is a graph of the relationship between resin concentration in a coating composition and the abuse resistance of the coating.

FIG. 3 is a graph of the relationship between the concentration of resin in coating compositions (percent by weight) and the ease of application/appearance (pattern uniformity) of the coating composition. FIG. 3 shows that there is little if any distinction between high and low levels of resin usage. FIG. 4 is a graph of the relationship between the concentration of resin in coating compositions (percent by weight) and the abuse resistance of the coating composition. FIG. 4 shows that the best abuse resistance comes at high resin concentrations. For best abuse resistance and application ease/appearance (uniformity), the most preferred coating composition would be one that had high levels of resin and high levels of sand aggregate.

Example 2

An abuse resistant coating composition of the drying type for float application was prepared in accordance with the formulation shown in Table 7.

TABLE 7

| Component | Pounds (Wet) | Pounds (Dry) | Percent (Dry) |
|---|---|---|---|
| Silica Sand 30–50 mesh | 500 (227 kg) | 500 (227 kg) | 19.36 |
| Resin | 200 (91 kg) | 116 (255 kg) | 4.49 |
| Calcium carbonate filler | 1550 (705 kg) | 1550 (705 kg) | 60.01 |
| Mica | 100 (45 kg) | 100 (45 kg) | 3.87 |
| Talc | 250 (114 kg) | 250 (114 kg) | 9.68 |
| Attapulgus clay | 50 (23 kg) | 50 (23 kg) | 1.94 |
| Cellulose thickener | 15 (6.8 kg) | 15 (6.8 kg) | 0.57 |
| Preservative | 2.0 (0.91 kg) | 2.0 (0.91 kg) | 0.08 |
| Water | 892 (405 kg) | | |
| Total Weight | 3559 (1618 kg) | 2583 (1174 kg) | 100.01 |

The Silica Sand 30-50 mesh aggregate was Wedron Silica Sand 30-50, sold by Fairmount Minerals that contains 90% of the particles between the designated screen sizes.

The resin was Halltech 41-355, a 58% solids polyvinyl acetate sold by Halltech Inc.

The calcium carbonate filler was Dolocron 4512 sold by Mineral Specialties, Inc. The mica was P80F Mica that is sold by United States. Gypsum Co.

The attapulgus clay was Super Gel B sold by Milwhite.

The cellulose thickeners were Methocel 250S, a methylhydroxypropyl cellulose sold by Dow Chemical, and Natrosol 250HXR sold by Hercules.

The preservative was a mixture of equal parts by weight of Troysan 174 and Fungitrol 158.

The composition was prepared by blending the water, latex and preservatives. Dry ingredients were added to liquid fraction and blended for 5 minutes using a Hobart mixer. Sufficient water was added to achieve a viscosity of 400–500 Brabender Units (B.U.; as measured with a Pin Type Sensor using a Brabender Viscocorder equipped with a 250 cmg head). The product was packaged and set aside until time of use.

At the time of use, the material was also thinned to a viscosity of 300 B.U., and then applied onto FIBEROCK panels, smoothed using a plastic float and allowed to dry for 1 week. When dry, the coating had an average thickness of 0.035 inches (890 microns). There were about 300 to 500 aggregate particles per square inch (46 to 78 particles per $cm^2$).

Abuse resistance was determined by ASTM D4977 (modified). Samples were cut from finished panels and were placed into a mechanical device used to scrub a wire brush (of a type available for this purpose from 3M) under a load of 27.5 lbs (12.5 kg) back and forth over the surface of the test panels until the surface of the test panel showed damage that could not be concealed by paint. This level of abuse (abrasion) damage is given as the number of cycles (a cycle is one back and forth motion).

Compositions of the type shown in Example 2 generated cycles of abrasion resistance in the range of 420 (drywall) to 660 (FIBEROCK) cycles, as compared to unpainted gypsum drywall giving 20–30 cycles of abuse resistance.

Example 3

A sprayable, abuse resistant coating composition of the drying type was prepared in accordance with the formulation shown in Table 8.

TABLE 8

| Component | Pounds (Wet) | Pounds (Dry) | Percent (Dry) |
|---|---|---|---|
| Calcium Carbonate 30–50 mesh aggregate | 418 (190 kg) | 418 (190 kg) | 43.59 |
| Resin | 102 (46 kg) | 59 | 6.15 |
| Calcium carbonate filler | 475 (216 kg) | 475 (216 kg) | 49.54 |
| Cellulose thickener | 3.9 (1.8 kg) | 3.9 (1.8 kg) | 0.41 |
| pH Adjuster | 2 (0.91 kg) | 2 (0.91 kg) | 0.21 |
| Preservative | 1 (0.45 kg) | 1 (0.45 kg) | 0.1 |
| Water | 285 (130 kg) | | |
| Total Weight | 1001.9 (455 kg) | 958.9 (436 kg) | |

The calcium carbonate aggregate was Georgia Marble GM 30-50.

The resin was Halltech 41-355, a 58% solids polyvinyl acetate latex sold by Halltech, Inc.

The calcium carbonate filler was Snowhite 21 sold by Omya/Pluess-Staufer.

The cellulose thickener was Walocel MT 10000pv, a methylhydroxyethylcellulose sold by Wolff-Walsrode.

The pH adjuster was lime.

The preservative was a mixture of equal parts by weight of Troysan 174 and Fungitrol 158.

The composition was prepared by blending the water, latex and preservatives. Dry ingredients were added to liquid fraction and blended for 5 minutes using a KitchenAid mixer. Sufficient water was added to achieve a viscosity of 300–400 Brabender Units (B.U.; as measured with a Narrow Double Flag Sensor using a Brabender Viscocorder equipped with a 250 cmg head). The product was packaged and set aside until time of use.

At the time of use, the material was also thinned to a viscosity of 300 B.U., and was applied to a wallboard surface by spray application using a Binks 18D spraygun using a #56 fluid nozzle and #R24 fan cap, using 60 psi (4.2 $kg/cm^2$) atomizing air and 28 psi (2.0 $kg/cm^2$) material feed pressure. Samples were allowed to dry for 1 week. When dry, the coating had an average thickness of 0.039 inches (990 microns). There were about 600 to 1000 aggregate particles per square inch (93 to 155 per $cm^2$).

Abuse resistance was determined by ASTM D4977 (modified). Samples were cut from finished panels and were placed into a mechanical device used to scrub a wire brush (of a type available for this purpose from 3M) under a load of 27.5 lbs (12.5 kg) back and forth over the surface of the test panels until the surface of the test panel showed damage that could not be concealed by paint. This level of abuse (abrasion) damage is given as the number of cycles (a cycle is one back and forth motion).

Compositions of the type shown in Example 3 generated cycles of abrasion resistance in the range of 700–900 cycles, as compared to unpainted gypsum drywall giving 20 to 30 cycles of abuse resistance.

A pair of sprayable abrasion resistant coating compositions were prepared in the manner of Example 3 wherein the relative amount of aggregate and resin was varied as shown in Table 8. The coatings were applied to substrates in the manner of Example 3 and for each sample, the particles per square inch were determined and the film thickness was measured. The results are shown in Table 8.

TABLE 8

| No. | Aggregate % | Resin % | Particles/ square inch | Thickness (mils) | Abrasion Resist.* |
|---|---|---|---|---|---|
| A | 43.63 | 6.17 | 720 (112 per $cm^2$) | 44.3 (1125 microns) | 9 |
| B | 39.37 | 7.19 | 933 (145 per $cm^2$) | 34.3 (871 microns) | 9 |

*Abrasion Resistance defined as level of damage on 1–10 scale (10 = highly resistant) from data from ASTM D4977 (modified as described) at 540 cycles.

The data shown in Table 8 shows that the film thickness of the spray applied coating compositions is naturally somewhat thicker than the float application because the coating is not flattened by the action of the float, but remains within a fairly narrow range (i.e. from 30 to 50 mils (762 to 1270 microns)) even when the relative amount of aggregate (as reflected by the particle count) is varied over fairly wide limits.

The forms of invention shown and described herein are to be considered only as illustrative. It will be apparent to those skilled in the art that numerous modifications may be made therein without departing from the spirit of the invention and the scope of the appended claims.

We claim:

1. A self-gauging coating composition comprising from about 3 to 10% by weight of a resin binder in which there is dispersed from about 18 to 55% by weight of an aggregate, said aggregate consisting of at least 90% of particles passing a 30 mesh screen and at least 90% particles retained a 50 mesh screen, the quantity of said aggregate being sufficient to form layer of aggregate particles having a thickness from about 0.020 inches to about 0.050 inches and having from about 200 to about 1000 particles of aggregate per square inch.

2. The self-gauging coating composition as described in claim 1, wherein said self-gauging composition is settable and contains sufficient aggregate to form a layer having from about 450 to about 650 particles of aggregate per square inch.

3. The settable self-gauging coating composition as described in claim 2, wherein said composition contains from about 18 to about 48 percent by weight of said aggregate and from about 3 to about 9 percent by weight of said resin binder.

4. The settable self-gauging coating composition as described in claim 3, wherein said composition contains about 30 percent by weight of said aggregate and about 8 percent by weight of said resin binder.

5. The self-gauging coating composition as described in claim 1, wherein said self-gauging composition is dryable and contains sufficient aggregate to form a layer having from about 300 to about 600 particles of aggregate per square inch.

6. The dryable self-gauging coating composition as described in claim 5, wherein said self-gauging composition contains from about 18 to about 49 percent by weight of said aggregate and from about 3 to about 9 percent by weight of said resin binder.

7. The dryable self-gauging coating composition as described in claim 6, wherein said composition contains about 31 percent by weight of said aggregate and about 7 percent by weight of said resin binder.

8. The self-gauging coating composition as described in claim 1, wherein said self-gauging composition is sprayable and contains sufficient aggregate to form a layer having from about 700 to about 1000 particles of aggregate per square inch.

9. The sprayable self-gauging coating composition as described in claim 8, wherein said quantity of aggregate is sufficient to form layer of aggregate particles having a thickness from about 0.030 inches to about 0.050 inches.

10. The sprayable self-gauging coating composition as described in claim 9, wherein said quantity of aggregate is sufficient to form layer of aggregate particles having an average thickness of about 0.039 inches.

11. The sprayable self-gauging coating composition as described in claim 8, wherein said self-gauging composition contains from about 30 to about 55 percent by weight of said aggregate and from about 5 to about 10 percent by weight of said resin binder.

12. The sprayable self-gauging coating composition as described in claim 11, wherein said composition contains about 44 percent by weight of said aggregate and about 6 percent by weight of said resin binder.

13. The self-gauging coating composition as described in claim 1, wherein said aggregate comprises calcium carbonate.

\* \* \* \* \*